3,042,686
EPOXYDICYCLOPENTYL ALCOHOLS AND PROCESS FOR PREPARING SAME
Joseph L. O'Brien, Elkins Park, and Constance A. Lane, Philadelphia, Pa., assignors to Rohm & Haas Company, Philadelphia, Pa., a corporation of Delaware
No Drawing. Filed Mar. 10, 1960, Ser. No. 13,986
6 Claims. (Cl. 260—348)

This invention relates to a new class of epoxy alcohols derived from dicyclopentadiene. More particularly it relates to epoxydicyclopentyl alcohols and to their preparation by epoxidation of the corresponding dicyclopentenyl alcohols. The olefinic alcohols used as starting materials in accordance with this invention are prepared according to the process disclosed in United States Patent No. 2,385,788 or in United States Patent No. 2,393,609.

The new epoxy alcohols may be represented by the following general formula:

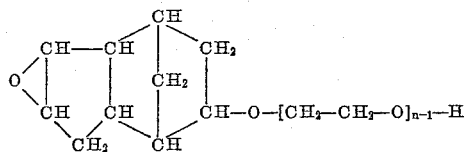

wherein $n$ is an integer having a value of 1 to 5, inclusive.

Typical of compounds within the scope of this invention are the following:

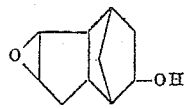

Epoxydicyclopentyl alcohol

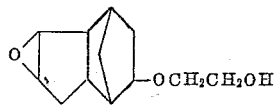

Epoxydicyclopentyloxyethanol

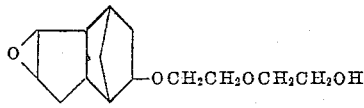

Epoxydicyclopentyloxyethoxyethanol

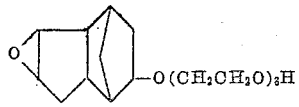

Triethylene glycol monoepoxydicyclopentyl ether

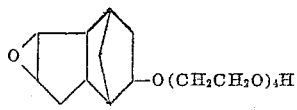

Tetraethylene glycol monoepoxydicyclopentyl ether

The compounds of this invention are prepared by reacting under controlled conditions a peracid, such as peracetic acid, with dicyclopentenyl alcohol or a glycol monodicyclopentenyl ether. An inert solvent, such as benzene or toluene, may be employed to moderate the exothermic reaction and to provide a more fluid system. However, the process may be carried out in the absence of solvent. The reaction temperature may be varied from about 0° C. to about 80° C., the preferred temperature range being from about 25° C. to about 50° C.

The commercial grade of peracetic acid, supplied as a 40% solution in glacial acetic acid, may be employed for the process of this invention. About 3% by weight of sodium acetate is added to removed the sulfuric acid normally present in the commercial reagent. Other peracids that may be employed are performic acid, perbenzoic acid, monoperphthalic acid, and the like.

The compounds of this invention are useful as reactive modifiers for epoxy resins to obtain resin systems of reduced viscosity and for the preparation of polymeric resins by reaction with polycarboxylic anhydrides in the presence of acidic catalysts.

The following examples serve to illustrate this invention.

EXAMPLE 1

*Preparation of Epoxydicyclopentyl Alcohol*

To 100 grams of dicyclopentenyl alcohol in 300 ml. of anhydrous benzene there was added, over a period of thirty minutes, 139 grams of a 40% solution of peracetic acid in glacial acetic acid, containing 4.2 grams of anhydrous sodium acetate. The temperature was maintained at 45–50° C. with stirring for an additional four hours. Upon cooling to 30° C., brine (400 ml.) was added and the solution was extracted twice with benzene. The combined benzene extract was washed with brine and 5% aqueous sodium carbonate solution, saturated with sodium chloride, until neutral. After drying over magnesium sulfate and stripping free of solvent to 100° C./40 mm., there remained 98.5 grams (89% yield) of a pale yellow oil. Distillation gave 91.5 grams (82.5% yield) of a single product distilling at 115–20° C./.04 mm., $n_D^{25}$=1.5155.

Analysis.—Calculated for $C_{10}H_{14}O_2$=C, 72.25%; H, 8.49%; oxirane oxygen, 9.63%. Found: C, 72.78%; H, 8.68%; oxirane oxygen, 9.0%.

The infrared spectrum of this product showed absorption bands characteristic of the hydroxyl group and oxirane ring, in accordance with the assigned structure.

EXAMPLE 2

*Preparation of Epoxydicyclopentyloxyethanol*

A solution of 105 grams of 40% peracetic acid in glacial acetic acid, containing 4.2 grams of anhydrous sodium acetate, was added to 97 grams of hydroxyethyl dicyclopentenyl ether in 300 ml. of benzene at 45–50° C. in thirty minutes. Stirring was continued at 45–50° C. for an additional four hours. Upon cooling to 30° C., brine (250 ml.) was added and the solution extracted twice with benzene. The combined benzene extract was then neutralized by washing with brine and aqueous carbonate solution, dried over mangesium sulfate and stripped to 100° C./40 mm. There remained 99 grams (94% yield) of crude product having an oxirane oxygen content of 6.97% and $n_D^{25}$=1.5117. Distillation gave 89 grams (85% yield) of a colorless oil, distilling at 120–140° C./.03 mm., $n_D^{25}$=1.5106.

Analysis.—Calculated for $C_{12}H_{18}O_3$: C, 68.54%; H, 8.63%; oxirane oxygen, 7.61%. Found: C, 68.76%; H, 8.62%; oxirane oxygen, 7.0%.

The infrared spectrum of this sample was in accordance with the assigned structure.

EXAMPLE 3

*Preparation of Epoxydicyclopentyloxyethoxyethanol*

To 119 grams of hydroxyethoxyethyl dicyclopentenyl ether in 400 ml. of anhydrous benzene, there was added 105 grams of 40% peracetic acid in glacial acetic acid, containing 4.2 grams of anhydrous sodium acetate. After an addition period of thirty minutes, stirring was continued at 45–50° C. for an additional four hours. Upon cooling to room temperature, the solution was diluted with brine and extracted with benzene. The benzene extract was washed with brine and aqueous carbonate solution until neutral, dried over magnesium sulfate and stripped to 100° C./40 mm. There remained 125 grams (98.5% yield) of the crude product having $n_D^{25}$ 1.5073 and 5.95% oxirane oxygen. Distillation gave 98 grams (77% yield) of a colorless oil distilling at 160–7° C./0.06 mm., $n_D^{25}$=1.5041.

Analysis.—Calculated for $C_{14}H_{22}O_4$: C, 66.11%; H, 8.72%; oxirane oxygen, 6.29%. Found: C, 66.37%; H, 8.63%; oxirane oxygen, 6.65%.

The infrared spectrum of this sample was in accord with the assigned structure.

EXAMPLE 4

*Preparation of Triethylene Glycol Monoepoxydicyclopentyl Ether*

By a procedure similar to that employed in Example 1, 141 grams of triethylene glycol monodicyclopentenyl ether gave 143 grams (96% yield) of crude product having $n_D^{25}$ 1.4993 and 4.93% oxirane oxygen. Distillation yielded 117 grams of a colorless oil, distilling at 180–190° C./.06 mm., $n_D^{25}$=1.4980.

Analysis.—Calculated for $C_{16}H_{26}O_5$: C, 64.41%; H, 8.78%; oxirane oxygen, 5.36%. Found: C, 64.85%; H, 8.79%; oxirane oxygen, 5.2%.

The infrared spectrum of this sample was in accordance with the assigned structure.

EXAMPLE 5

*Preparation of Tetraethylene Glycol Monoepoxydicyclopentyl Ether*

A similar procedure to that used in Example 1 was followed using 33 grams of tetraethylene glycol monodicyclopentenyl ether. It gave 32.5 grams (95% yield) of crude product having $n_D^{25}$ 1.5004 and 4.56% oxirane oxygen. Distillation yielded 21 grams of a clear, yellow oil distilling at 200–235° C./.05–0.20 mm., $n_D^{25}$=1.5024.

Analysis.—Calculated for $C_{18}H_{30}O_6$: C, 63.14%; H, 8.83%; oxirane oxygen, 4.67%. Found: C, 64.13%; H, 8.60%; oxirane oxygen, 4.8%.

The infrared spectrum of this sample was in accordance with the assigned structure.

EXAMPLE 6

*Compositions of Epoxydicyclopentyl Alcohol With Bis-Epoxides and Polycarboxylic Acid Anhydrides*

The bis-epoxide used in this example is the bis-epoxydicyclopentyl ether of ethylene glycol, designated AG–13–E, and prepared in accordance with the teaching of United States Patent No. 2,543,419. This material is a waxy solid which forms relatively viscous mixtures with polycarboxylic acid anhydrides. Addition of epoxydicyclopentyl alcohol results in a less viscous resin which shows a more moderate exotherm when cured in the presence of acidic catalysts. To a mixture of 144 parts of AG–13–E, 17 parts of epoxydicyclopentyl alcohol, and 57 parts of methylsuccinic anhydride was added 1% by weight of a 50% aqueous solution of cadmium fluoborate. There was a mild exotherm as the mixture was stirred and a thick gel formed within five minutes. The gel was heated for two hours at 80° C. and then for 16 hours at 120° C. A clear amber resin having a Barcol hardness of 35 was obtained.

Other commercial epoxy resins and other polycarboxylic acid anhydrides were reacted with epoxydicyclopentyl alcohol in the above manner with substantially the same results.

We claim:

1. A compound of the formula

[structural formula]

wherein $n$ is an integer having a value of 1 to 5, inclusive.

2. Epoxydicyclopentyl alcohol of the formula

[structural formula]

3. Epoxydicyclopentyloxyethanol of the formula

[structural formula]

4. Epoxydicyclopentyloxyethoxyethanol of the formula

[structural formula]

5. Triethylene glycol monoepoxydicyclopentyl ether of the formula

[structural formula]

6. Tetraethylene glycol monoepoxydicyclopentyl ether of the formula

[structural formula]

References Cited in the file of this patent

UNITED STATES PATENTS

| | | |
|---|---|---|
| 2,543,419 | Niederhauser | Feb. 27, 1951 |
| 2,881,208 | Buchner et al. | Apr. 7, 1959 |

Notice of Adverse Decision in Interference

In Interference No. 93,992 involving Patent No. 3,042,686, J. L. O'Brien and C. A. Lane, EPOXYDICYCLOPENTYL ALCOHOLS AND PROCESS FOR PREPARING SAME, final judgment adverse to the patentees was rendered July 30, 1965, as to claims 1, 2 and 3.

[*Official Gazette September 28, 1965.*]